June 2, 1970      C. H. SPARKS      3,514,791
TISSUE GRAFTS
Filed July 25, 1967      2 Sheets-Sheet 1
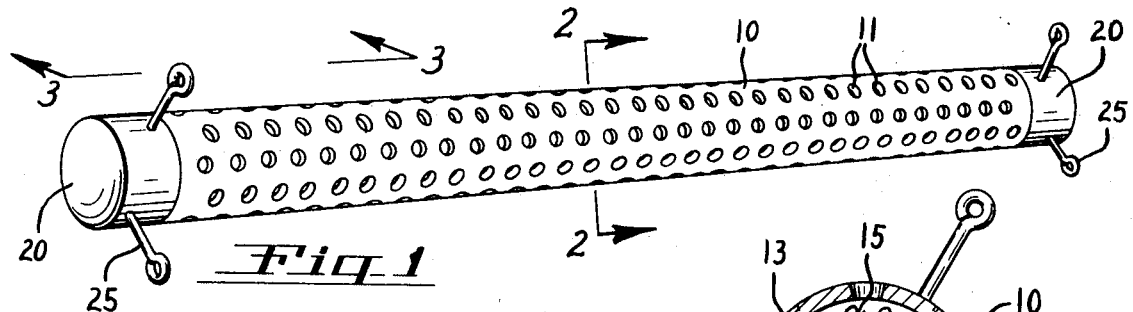
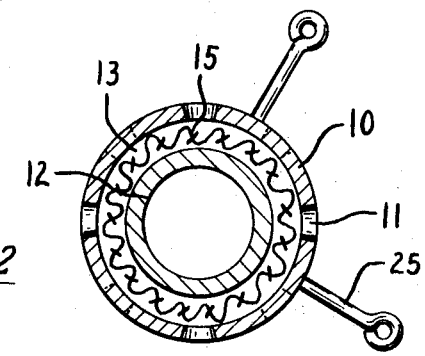
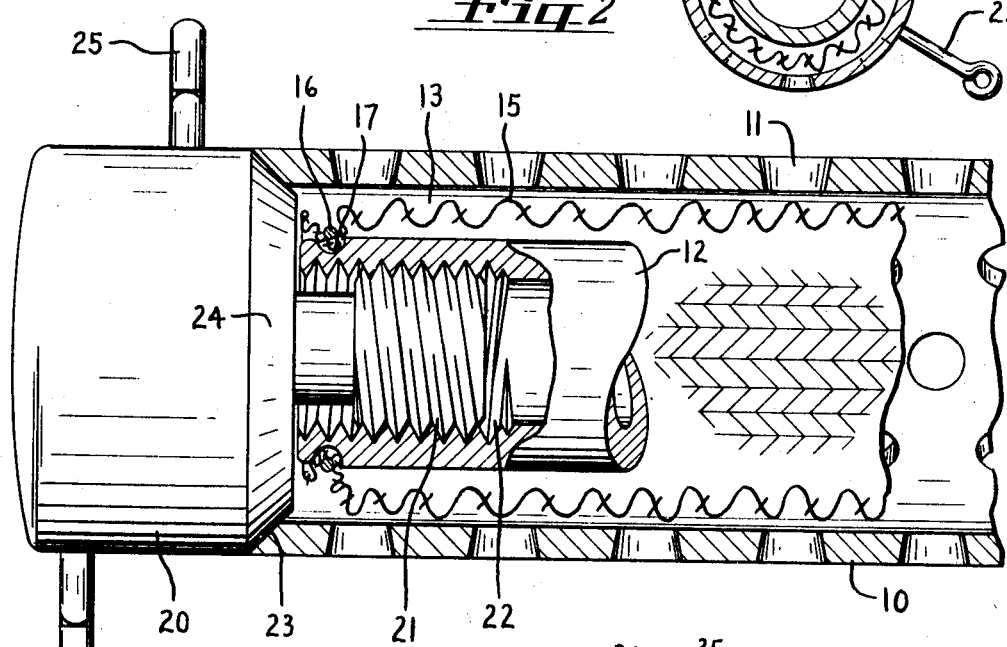
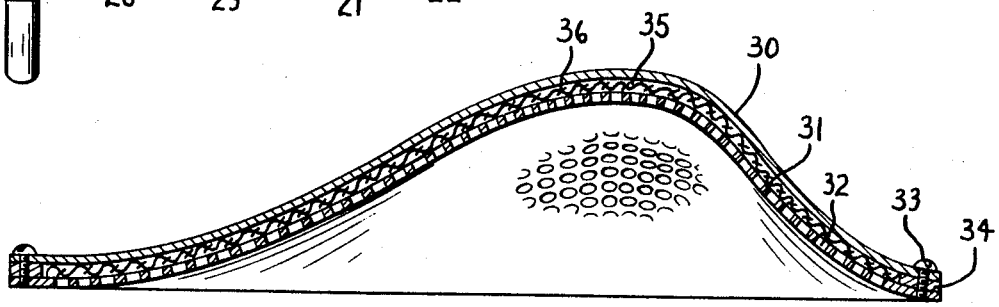
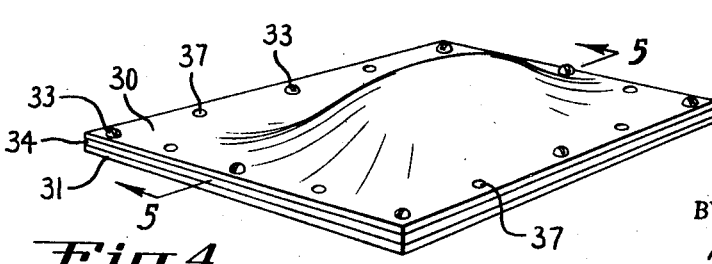
INVENTOR.
CHARLES H. SPARKS
BY
*Attorney*

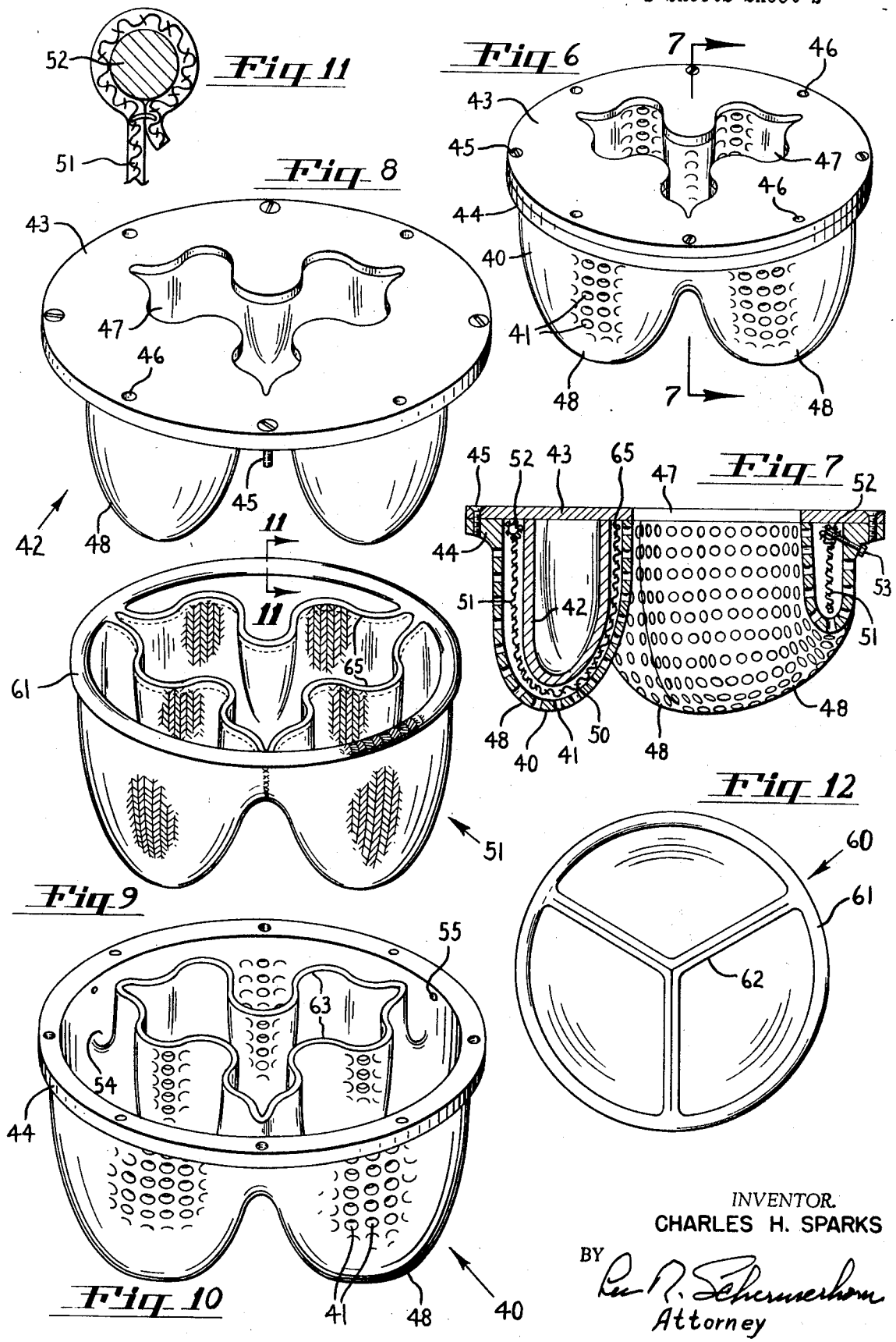

United States Patent Office 3,514,791
Patented June 2, 1970

3,514,791
TISSUE GRAFTS
Charles H. Sparks, 3725 SE. Martins St.,
Portland, Oreg. 97202
Filed July 25, 1967, Ser. No. 655,838
Int. Cl. A61f *1/22, 1/24*
U.S. Cl. 3—1                                    19 Claims

ABSTRACT OF THE DISCLOSURE

Method and apparatus for growing a graft structure, particularly in a patient's own body. A perforated die of suitable shape to mold the desired structure is implanted in the patient's body. Cloth reinforcing material is placed in the die. Connective tissue grows into the die through the perforations and encapsulates the cloth, filling the die cavity. The die may be seeded with cells to make special parts, periosteal cells being used to make bones and epithelial cells being used to make epithelial tissue. The dies may be shaped to form relatively simple parts such as tendons and tubes and also more complex parts such as complete tricuspid heart valves.

BACKGROUND OF THE INVENTION

This invention relates to a novel method and apparatus for growing tissue grafts and has particular reference to grafts grown within the patient's own body.

Various methods have heretofore been employed to supply replacement parts for the human body. Manufactured parts have been used, such as heart valves, metal plates to replace bone structure and fabric tubes to replace parts of arteries, esophagus, etc. Heterografts from animals have been used to replace heart valves and valve cusps. Homografts from other humans have been used for the same purposes.

Fabric grafts have been used with some degree of success to replace or bypass a diseased segment of artery in the case of arteries larger than 8 mm. in diameter. This technique is extremely difficult, however, and generally unsuccessful in smaller arteries. The use of such grafts in the venous system has, with a few exceptions, been unsuccessful.

While some of these techniques have had a measure of success, nevertheless they are employed generally as a last resort because nothing better has been available. They are all subject to numerous complications arising, essentially, from the phenomenon of foreign body rejection. This is true regardless of whether the foreign body is an article of manufacture, animal tissue or even tissue derived from another human. Simply stated in non-medical terms, such graft devices are incompatible with a patient's body and the reaction of the patient's body to the implanation of such foreign bodies produces an undesirable result to some degree in all cases.

Autogenous vein grafts (non-critical veins taken from the patient's own body) have been used but the supply is limited and compromises are almost always encountered due to inadequate size and/or length of the veins available for use.

In certain other instances it has also sometimes been possible to use one part of the patient's body for repair of some other part. Thus, a small piece of bone from one location may be used successfully as a graft in a different location. But the availability of suitable bone structure for such purposes is obviously very limited. Similarly, the transverse colon has been used to replace all or part of the esophagus. This is highly undesirable, however, because of the magnitude of the surgery involved and the deranged physiology which results in poor health.

SUMMARY OF THE INVENTION

According to the present invention, the foregoing disadvantages and difficulties are obviated by providing implantable dies for growing graft structures preferably of the patient's own tissues in the patient's own body. The dies are perforated to permit ingrowth of connective tissue. Such ingrowth is promoted by anchoring the die in a relatively fixed position as, for example, to the rib cage or other suitable supporting structure. Cloth reinforcement is placed in the die. The inherent rejection phenomenon of the body is utilized to advantage by encapsulation of the cloth whereby the die cavity becomes completely filled with the connective tissue. This forms a replacement part composed of the patient's own tissue reinforced by the mesh which imparts the necessary strength. When the graft is implanted in the patient, healing is rapid and the numerous undesirable effects experienced with manufactured parts, heterografts and homografts do not occur.

By way of example, the dies for a number of different types of grafts are illustrated and described. The tube graft die comprises merely a perforated tube containing a mandrel. A sleeve of suitable reinforcement material such as Dacron mesh is attached to the mandrel and the ends of the die are equipped with means to anchor the die to the rib cage or other structure so that the die will be immobilized in the body. Natural body processes produce the necessary connective tissue which penetrates the perforated outer wall and encapsulates the mesh to fill the die cavity and form a graft tube having inner and outer surfaces of smoothness corresponding to the smoothness of the die cavity.

A similar die is used to form a tendon except that the mandrel is more slender. There are also illustrated dies for growing a tricuspid heart valve structure and a curved bone plate. The latter is seeded with periosteal cells to produce bone tissue instead of merely connective tissue. The tube die may be seeded with epithelial cells to produce a tube of epithelial tissue for replacement of portions of the gastrointestinal tract or other such structures. In a similar manner, dies may be made for growing still other body parts.

The invention has the additional advantage of making it possible to grow certain structures such as arterial tubes, valves, etc., in one individual for use in another, as homografts. Rejection is less likely to occur than with conventional homografts because the new connective tissue grown in the present dies in a primitive type of tissue which is not differentiated into special structures with special functions such as kidney, heart, brain, nerve, etc., and contains no lymphatic structures. It is recognized that the more highly differentiated a tissue is in special structures, the more likely rejection is to occur. Experimental work indicates that the rejection phenomenon is primarily centered in the lymphatic (reticulo-endothelial) system. There are no lymphatic structures in the present grafts.

The general object of the invention is, therefore, to provide a novel method and apparatus for growing tissue grafts, and to provide method and apparatus for growing autogenous grafts within a patient's own body. Other objects are to provide dies for certain specific parts such as tubes, heart valves and bone, to provide a method for growing particular kinds of tissue such as bone and epithelium and to provide tissue grafts as described which are grown in a die in a living body.

Other objects and advantages will become apparent and the invention will be better understood with reference to the following description of certain preferred embodiments illustrated in the accompanying drawings. Various changes may be made, however, in the details of the

BRIEF DESCRIPTION OF THE DRAWINGS

FIG. 1 is a perspective view of a tube die embodying the principles of the invention;

FIG. 2 is an enlarged view on the line 2—2 in FIG. 1;

FIG. 3 is an enlarged view on the line 3—3 in FIG. 1;

FIG. 4 is a perspective view of a die for growing a curved bone plate;

FIG. 5 is a view on the line 5—5 in FIG. 4;

FIG. 6 is a perspective view of a die for growing a tricuspid heart valve;

FIG. 7 is a view on the line 7—7 in FIG. 6;

FIG. 8 is a perspective view showing the top plate and inner die member in FIGS. 6 and 7;

FIG. 9 is a perspective view showing the reinforcing material in FIG. 7;

FIG. 12 is a top plan view of a tricuspid heart valve member in FIGS. 6 and 7;

FIG. 11 is an enlarged view on the line 11—11 in FIG. 9; and

FIG. 12 is a top plan view of a tricuspid heart valve made in the die of FIG. 6, showing the configuration of the valve leaflets in closed position.

DESCRIPTION OF THE PREFERRED EMBODIMENTS

The tube die in FIG. 1 comprises a stainless steel tube 10 containing perforations 11 and a stainless steel mandrel 12. When the die is disposed in a living body, connective tissue grows through perforations 11 to fill the annular die cavity 13 between the mandrel 12 and tube 10. In order to provide smooth inner and outer surfaces on the graft tube thus grown in the die cavity 13, the mandrel and inside surface of tube 10 are polished and the outside of tube 10 is polished to prevent adherence of connective tissue.

Contained in the space 13 is a tube of suitable reinforcing material such as Dacron mesh. For arterial use this may be a knitted or woven fabric. In order to provide adequate longitudinal and circumferential strength for certain purposes, this material is preferably woven in such a manner as to have its strands running longitudinally and circumferentially. For some structures such as veins, esophagus, trachea and common bile duct, the mesh tube may incorporate rings of rigid or semirigid material to provide resistance against compression and collapse of the graft tube.

The ends of mesh tube 15 are secured to the mandrel by a thread 16 wound in groove 17 at each end. Connective tissue entering the perforations 11 penetrates and completely encapsulates the mesh 15 finally completely filling the cavity 13. The connective tissue forms a cast inner surface on mandrel 12 and a cast outer surface on the inside of tube 10.

Mandrel 12 and mesh tube 15 are supported in tube 10 by a pair of end plugs 20 having threaded studs 21 which are screwed into internally threaded end portions 22 of the mandrel. Tube 10 has conical end surfaces 23 to seat conical surfaces 24 on plugs 20 whereby the mandrel is centered in tube 10.

The plugs 20 are equipped with spokes 25 for tying the ends of the die to the ribs or other skeletal structure so as to hold the die relatively immovable in the body. It is desirable that body tissue press steadily against the die without relative movement so that connective tissue will grow immediately through the perforations 11 into the die cavity in minimum time.

It is often desirable to prefill the die with a nutrient medium before implantation for the purpose of decreasing the time required to grow the graft in the die. This is done by withdrawing a quantity of the patent's own blood rapidly and injecting it into the die before it has time to clot. The blood will then immediately clot within the die so that it will not escape through perforations 11. The blood is absorbed and replaced by the invading connective tissue.

When a tube graft of epithelial tissue is desired for the gastrointestinal tract or other such structures, the die may be seeded with epithelial cells. This is accomplished by removing some epithelial tissue from the patient, dicing it and dispersing it in unclotted blood from the patient and then injecting the suspension into the die cavity and allowing the blood to clot therein. Clotting may be delayed by heparinizing the blood if necessary.

It is also within the scope of the invention to produce composite tubes consisting of an inner epithelial tube and an outer connective tissue tube, each produced in its own separate die and then assembled together as a laminated structure.

The tube die shown in FIGS. 1 to 3 is of particular advantage for making artery and vein grafts smaller than 8 mm. in diameter, in which size range previously known vascular grafts were almost universally unsuccessful. A major difficulty with artificial grafts heretofore proposed of such small size is a tendency to develop a lining which so decreases the lumen size as to make the graft incompetent. A lining does not form in the present graft tubes.

When the graft is fully developed in the die, the die is removed from the patient's body by cutting the ties from spokes 25 and snipping the connective tissue on the outside of perforations 11. Then the end plugs 20 are removed and ties 16 cut to allow withdrawal of the mandrel 12. The graft is then easily removed from tube 10. Upon transplantation the graft readily develops it own blood supply from adjoining tissue and remains viable, equivalent to original body tissue.

Tendon grafts are made in the tube 10 by using a mandrel of smaller diameter. This produces a tendon having a longitudinal opening through its center. After the mandrel has been withdrawn, the tendon may be readily pulled out of tube 10, tension on the tendon causing it to contract sufficiently in diameter to free itself from the tube 10.

FIGS. 4 and 5 illustrate a die for making a bone graft. An outer imperforate die plate 30 and a matching inner plate 31 having perforations 32 are formed to the desired shape. The plates are clamped together by screws 33 and are held separated as shown by a marginal spacer 34 to produce a die cavity 35. In this die cavity is disposed a sheet of suitable reinforcement 36, such as Dacron mesh. Additional holes 37 are provided to tie the die in rigid position against some appropriate part of the skeletal structure of the patient.

Before implanting the bone graft die, it is seeded with periosteal cells. This is accomplished by stripping periosteum from the outer surfaces of the patient's ribs or other bones and dicing it with a sharp knife into pieces about 1 to 2 mm. square. These diced pieces are dispersed in freshly drawn blood from the patient and the suspension is introduced into the die cavity 35. This is done rapidly so that the blood will not clot until after it is in the die cavity or, if necessary, heparin may be used to retard clotting. Then the die is ready for implanting.

When the bone graft has grown to fill the die cavity, the ties are removed from holes 37 and the connective tissue on the outside of perforations 32 is snipped, allowing the die to be removed from the patient. Upon removing screws 33 and separating die plates 30 and 31, the graft is removed and trimmed to the desired outline shape and is ready for use. Depending upon the length of time the die is implanted, the graft will contain connective tissue with interspersed periosteal tissue or a fully developed calcified bone. If the graft is transplanted in the former condition, it will continue to convert into a fully developed calcified bone in the body.

A die of suitable shape for forming a curved bone plate for use in the skull is illustrated. It may be preferred, however, to reverse the positions of the perforated and imperforate plates so that the graft will have a smooth concave surface to lay against the brain. The die may be shaped to produce a vertabra or other bone structure as desired. It is also within the scope of the invention to perforate both plates and to omit the cloth reinforcement if desired.

FIGS. 6 to 12 illustrate a die for growing a complete tricuspid heart valve. This die comprises an outer die member 40 having perforations 41 and an inner imperforate die member 42. Die member 42 is made integral with a top plate 43 which is connected to a flange 44 on die member 40 by marginal screws 45. Additional holes 46 may be provided in top plate 43 and flange 44 for tying the die to the skeletal structure as described in connection with the previous dies. The central portion of top plate 43 is preferably cut away to form an opening 47 between the three lobes 48 of the die.

The outer and inner die members 40 and 42 form therebetween a die cavity 50 as shown in FIG. 7 in which the heart valve is grown. Dependent in the cavity 50 is the reinforcing member 51 of knitted Dacron mesh or other suitable material shown in FIG. 9. Mesh reinforcing member 51 has a peripheral upper edge secured to a stainless steel supporting ring 52. Ring 52 is provided with three tapped holes to receive three screws 53 in outer die member 40 as shown in FIG. 7. These screws are adjusted to support ring 52 adjacent to top plate 43 and in mid position between the opposite walls of die cavity 50. In order to provide space for the ring 52, inner wall portions of the outer die member 40 are recessed at 54 as shown in FIG. 10.

Connective tissue entering the die cavity through perforations 41 encapsulates the mesh reinforcing member 51 and completely fills the die cavity to form a valve graft 60 in FIG. 12, which is similar in shape to the reinforcing member 51 in FIG. 9. Thus, the graft 60 has a rigid circular base rim 61 containing the steel ring 52 which is utilized for suturing the graft to the aortic ring of the patient.

The three lobes 48 in the die cavity form three pocket-shaped portions of the graft, the outer walls of these graft lobes adjacent to ring 52 preferably being thicker than the inner walls 62 which form the valve leaflets. Also, the outer walls of the graft taper downwardly as seen in the shape of the die cavity in FIG. 7.

The inner portions of the die cavity which form the inner walls 62 are of sinuous configuration as indicated by the sinuous shape of the upper end of the inner walls of the outer die member indicated at 63 in FIG. 10. The length of the die cavity along wall 63 in each lobe is such that the upper ends of the three valve leaflets of the graft at 62 will meet together as shown in FIG. 12 when the valve is closed. When the valve is open, the three edges 62 retreat away from each other to provide a valve opening.

This is also illustrated in FIG. 9 wherein the upper edge portions 65 of the reinforcing mesh are shown in the same configuration they assume in the die cavity, the latter having approximately the configuration assumed by the leaflets of the graft in open position. The fullness of the edges 65 allows them to close together as indicated at 62 in FIG. 12. Edges 65 are preferably reinforced by providing excess material which is folded over and hemmed.

A bicuspid valve may be formed by providing a similar two-lobed die, this not being illustrated as it is considerably less complicated. When necessary, to prevent the cusps from inverting, the chordae tendonae for the valve leaflets may be formed separately as tendons as described in connection with FIG. 1 and sutured in desired positions when the graft is transplanted.

Dies may also be made for individual valve leaflets. Further, it is within the scope of the invention to provide a die for a complete ventricle graft for artificial pulsation in the patient. A ventricle may be made as a tube having a valve at each end, thus combining the teachings of FIGS. 1 and 6.

Having now described my invention and in what manner the same may be used, what I claim as new and desire to protect by Letters Patent is:

1. The method of making a composite graft tube comprising growing a tube of connective tissue in a die implanted in a living body, growing a tube of smaller size of epithelial tissue in a die implanted in said body, and inserting said second tube in said first tube.

2. The method of forming a graft structure comprising providing a perforated die having a die cavity; inserting a layer of cloth in said die cavity; filling said die cavity with a nutrient medium for connective tissue; implanting said die containing said cloth and nutrient medium in a living body for a time sufficient for connective tissue to grow into the die, absorb said nutrient medium, encapsulate said cloth and fill said die cavity to form said graft structure; removing said die form said living body; and then removing said graft structure from said die.

3. The method of claim 2, said nutrient medium comprising blood, said blood being allowed to coagulate in the die before implantation.

4. The method of claim 2 including the steps of preparing a suspension of diced living tissue in said nutrient medium and filling said die cavity with said suspension.

5. The method of claim 4, said diced living tissue comprising specialized cells.

6. The method of claim 5, said specialized cells comprising epithelial tissue.

7. The method of claim 5, said specialized cells comprising periosteal tissue to form a bone graft.

8. The method of claim 3, wherein said die is implanted in the patient who is to receive said graft structure and said blood is obtained from said patient.

9. The method of claim 2 including installing said graft structure in a patient substantially immediately after said die has been removed from said implantation and said graft structure has been removed from said die.

10. The method of forming and utilizing an autogenous graft structure in a patient comprising providing a perforated die having a die cavity; inserting a layer of cloth in said die cavity; filling said die cavity with blood from said patient and allowing said blood to coagulate therein; implanting said die containing said cloth and coagulated blood in said patient for a time sufficient for connective tissue to grow into the die, absorb said blood, encapsulate said cloth and fill said die cavity to form said graft structure; removing said die from said patient; removing said graft structure from said die; and installing said graft structure in said patient.

11. An autogenous graft structure for a patient comprising a layer of cloth positioned within a perforated die, said layer of cloth having an encapsulation, said encapsulation comprising said patient's own tissue grown in the patient's body.

12. A graft structure as defined in claim 11, said encapsulation being the product of the growth of epithelial tissue from said patient.

13. A graft structure as defined in claim 11, said encapsulation being the product of the growth of periosteal tissue from said patient.

14. An autogenous graft tube for a patient comprising a cloth tube positioned between telescoping perforated dies defining an annular die cavity therebetween, said cloth tube having an encapsulation, said encapsulation having die-formed inner and outer surfaces, said encapsulation comprising said patient's own tissue grown in the patient's body.

15. A composite graft tube comprising a die-formed tube of connective tissue grown in a living body, a smaller diameter die-formed tube of epithelial tissue grown in said body, said second tube being inserted in said first tube.

16. An autogenous heart valve for a patient comprising a die-formed encapsulation of reinforcing members, said members comprising a base ring and cloth secured to said ring and extending into leaflet portions of the valve, said encapsulation comprising said patient's own tissue grown in the patient's body.

17. A tissue die for implantation in a living body to form a tubular graft body by the ingrowth of connective tissue comprising a perforated die tube, a mandrel, means holding said mandrel centered in said tube to form an annular die cavity, and a cloth tube in said die cavity surrounding said mandrel and arranged for encapsulation by said connective tissue.

18. A tissue die for implantation in a living body to form a heart valve graft by the ingrowth of connective tissue comprising a pair of die members fitting together to form a die cavity in the shape of a heart valve having a circular base portion and a plurality of valve leaflets, at least one of said members being perforated, a graft reinforcing ring, means detachably supporting said ring in said base portion of said cavity, and cloth reinforcing material in the leaflet portions of said cavity connected with said ring and arranged for encapsulation by said connective tissue.

19. A tissue die for implantation in a living body to form a heart valve graft by the ingrowth of connective tissue comprising a perforated female die member having a circular base portion interconnecting a plurality of lobe portions, a male die member having a circular base portion interconnecting lobe portions within said female lobe portions, said two die members forming a die cavity therebetween, said base portion of said male die member having a central opening therein communicating with an open space between said lobe portions of said female die, means securing the base portions of said male and female die members together, a graft reinforcing ring, means securing said ring in said die cavity adjacent said base portions of said die members, and cloth reinforcing material in said die cavity connected with said reinforcing ring arranged for encapsulation by said connective tissue.

References Cited

UNITED STATES PATENTS

| 3,126,884 | 3/1964 | Tucker | 128—1 |
| 3,197,788 | 8/1965 | Segger | 3—1 |
| 3,272,204 | 9/1966 | Artandi et al. | 3—1 XR |

FOREIGN PATENTS

| 834,256 | 5/1960 | Great Britain. |
| 1,016,811 | 1/1966 | Great Britain. |

OTHER REFERENCES

Ear molds, Peertype, Catalog No. 6452, Vitallium Surgical Appliances, Austenal Laboratories, Inc., Catalog, Surgical Div., 224 E. 39th St., N.Y., N.Y., p. 20, March 1948.

RICHARD A. GAUDET, Primary Examiner

R. L. FRINKS, Assistant Examiner

U.S. Cl. X.R.

128—92, 334